Figure 1:
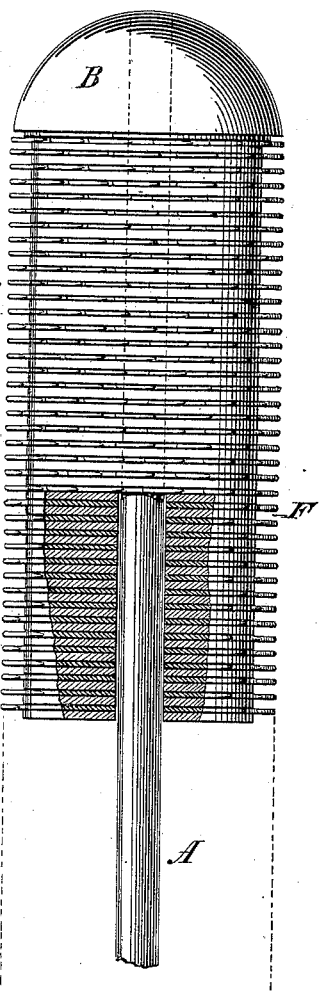

(No Model.)

C. T. MASON, Jr.
COTTON PICKER STEM.

No. 311,344. Patented Jan. 27, 1885.

WITNESSES:
Gustave Dieterich
A. J. Stewart

INVENTOR
Charles T. Mason Jr
BY Park Benjamin Son
his ATTORNEYS.

N. PETERS, Photo-Lithographer, Washington, D. C.

UNITED STATES PATENT OFFICE.

CHARLES T. MASON, JR., OF SUMTER, SOUTH CAROLINA.

COTTON-PICKER STEM.

SPECIFICATION forming part of Letters Patent No. 311,344, dated January 27, 1885.

Application filed January 5, 1884. (No model.)

*To all whom it may concern:*

Be it known that I, CHARLES T. MASON, Jr., of Sumter, Sumter county, South Carolina, have invented a new and useful Improvement in Cotton-Picker Stems, of which the following is a specification.

The invention relates to cotton-picker stems such as are used for gathering cotton from the bolls, and to the improved construction of the stem, as more particularly hereinafter set forth.

The invention consists in a stem containing a central rod and fixed end piece, on which rod are placed disks of thin sheet metal having bent teeth secured around the circumferences of said disks. Alternating with the aforesaid disks are thin spacing-disks.

In cotton-picker stems hitherto constructed containing toothed disks and alternating plain disks, the plain disks have been made of a diameter about equal to the diameter of the toothed disks plus the lengths of the two diametrically-opposite teeth, so that said plain disks formed partitions or guards not only between the solid portions of the adjacent toothed disks, but between the teeth or toothed portions of said disks. These partitions are adjusted so as to be quite close to the teeth, and hence so that the space or interval between them is very small. The object of this arrangement is to prevent the teeth from catching or engaging with leaves or woody parts of the plants of a length greater than the interval between said partitions. So, also, the partitions form guards which, meeting the hard woody or other foreign material, in great measure prevent it from ever engaging with the teeth. The cotton fiber, however, being soft and elastic, is free to expand into the space between the partitions and be caught by the teeth when the stem is pressed against the boll.

While the aforesaid arrangement is by no means inoperative in practice, I have found it to possess a disadvantage, which is that by reason of the necessarily small interval between the guards or partitions and their close proximity to the teeth the amount of cotton which the latter can collect before clearing becomes necessary is quite small, or, in other words, the small space between teeth and partitions very soon becomes filled up, and then the movement of the stem must be reversed, or other means taken to remove the cotton. This reversing or clearing of the stem, when done frequently, involves much loss of time, frequent changes in the direction of motion of the mechanism, and hence lost power, and the cotton is not apt to be so completely stripped from the bolls. My present invention overcomes the aforesaid difficulty in a simple and effective manner.

Figure 3:
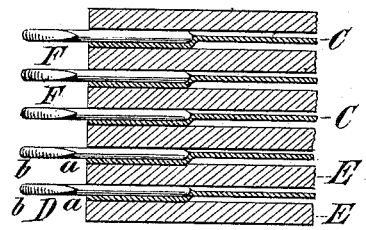
Figure 4:
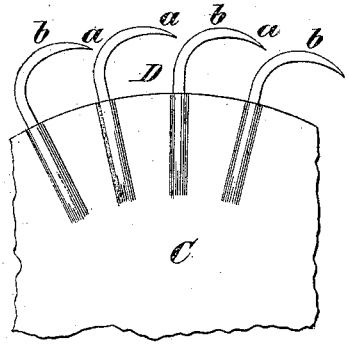
Figure 2:
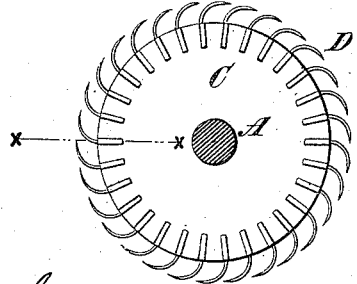

Referring to the drawings, Figure 1 is an elevation of my improved stem with a portion broken away, and in section to show the internal construction. Fig. 2 shows one of the toothed disks. Fig. 3 is a partial section of one of said disks on the line $xx$ of Fig. 2. Fig. 4 is a view of a portion of one of said disks enlarged, showing the teeth.

Similar letters of reference indicate like parts.

A is the central rod or stem. B is a rounded cap-piece rigidly secured to the end of said rod. C is a disk of thin plate or sheet metal, having secured by solder or otherwise in struck-up recesses at the circumference bent wire teeth D. The engaging end $a$ of each tooth is even with or slightly below the back $b$ of said tooth. The said end is also placed in close proximity to the back of the next adjacent tooth, Fig. 4. In this way the backs of the teeth form guards for the points and prevent the latter engaging with the hard or woody portions of the plant.

Between the toothed disks C, which have central apertures through which the rod A passes, are interposed thin spacing-disks E. These spacing-disks are equal in diameter to the solid portions of the toothed disks, so that the teeth D, as shown in Fig. 3, extend beyond said spacing-disks. The spacing-disks should be made thin, so that the cotton-receiving spaces or intervals F, which they cause to be formed between the teeth of two adjacent toothed disks, will be abundantly large for the cotton to expand into, but small enough to keep out pieces of leaves, burrs, &c. I find that intervals of about one-sixteenth inch left between the teeth of adjacent circumferential rows answer practical requirements in this respect. It will be obvious that by this arrangement I construct a stem which will discriminate between the cotton fiber and other parts of the plant without the use of guards or partitions between the teeth, and at the same time will present a larger available space in which cotton can be collected by the teeth, so that the cotton-stem will operate longer, and so gather more cotton before clearing becomes necessary.

I claim as my invention—

1. In a cotton-picker stem, two or more circumferential rows of picking-teeth projecting from the outer periphery of said stem, the said teeth bent over or curved, and having the end or point of each tooth disposed at a level with or below the upper side of the bent-over portion of said tooth, and cotton-receiving intervals or spaces between said rows of teeth, substantially as described.

2. In a cotton-picker stem, two or more circumferential rows of picking-teeth projecting from the outer periphery of said stem, the said teeth being bent over or curved in the same direction, and the end or point of each tooth being placed in close proximity to the next adjacent tooth and disposed below the level of the upper side of the bent-over portion of said adjacent tooth, and cotton-receiving intervals or spaces between said rows of teeth, substantially as described.

3. In a cotton-picker stem, a series of disks of like diameter, each alternate disk having bent-over or curved teeth projecting from its circumference, substantially as described.

4. In a cotton-picker stem, the combination of a central rod, a fixed head or cap on the end of said rod, and a series of alternately toothed and plain disks, central apertures for the reception of said rod, the teeth on said toothed disks projecting radially beyond the peripheries of the plain disks, substantially as described.

5. In a cotton-picker stem, a picking-disk of thin metal having a central aperture to receive a supporting-rod, and having struck-up radial recesses around its circumference and bent-metal teeth secured in said recesses, substantially as described.

6. In a cotton-picker stem, a central rod, and supported thereon a series of disks of substantially uniform diameter, each alternate disk having picking-teeth projecting radially from its periphery, the point of each tooth being bent over and disposed at or below the level of the upper side of the bent-over portion of the next adjacent tooth, substantially as described.

7. The combination of the central rod, A, disks C, having bent radially-projecting picking-teeth D, and interposed spacing-disks E, uniform in diameter with disks C, substantially as described.

CHARLES T. MASON, Jr.

Witnesses:
R. S. BRADWELL,
WM. H. CUTTINO.